Patented Apr. 22, 1930

1,755,879

UNITED STATES PATENT OFFICE

GEORG KALISCHER AND HEINZ SCHEYER, OF FRANKFORT-ON-THE-MAIN, GERMANY, ASSIGNORS TO GENERAL ANILINE WORKS, INC., OF NEW YORK, N. Y., A CORPORATION OF DELAWARE

CONDENSATION PRODUCTS OF THE BENZANTHRONE SERIES AND PROCESS OF MAKING SAME

No Drawing. Application filed July 9, 1927, Serial No. 204,657, and in Germany September 4, 1926.

Our invention relates to new condensation products of the benzanthrone series, and to a process of preparing the same. More particularly it relates to the compounds of the general formula:

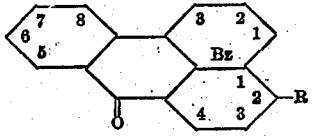

wherein R represents an aromatic nucleus substituted by hydroxyl in one of the positions ortho and para to the bridge carbon atom and wherein the benzanthrone nucleus and the aromatic nucleus R may be further substituted. They are obtainable, for instance, by heating at an elevated temperature and in the presence of a caustic alkali a benzanthrone compound having a free 2-position with an aromatic hydroxycompound having a free ortho- or para-position. In order to avoid the formation of dibenzanthrone compounds advantageously only such an amount of caustic alkalies should be added, which is necessary for the formation of phenolate, taking care of not exceeding essentially this quantity.

The new compounds are when dry yellowish to brownish colored mostly crystalline powders, soluble in organic solvents of a higher boiling point, soluble in concentrated sulfuric acid with a red to brown to olive color, mostly soluble in an alcoholic caustic alkali solution to intensely colored solutions. They may be used as intermediates for the production of dyestuffs.

In order to further illustrate our invention the following examples are given, the parts being by weight and all temperatures in centigrade degrees, but it is understood, that our invention is not limited to the particular products or reacting conditions mentioned therein.

Example 1

At about 140°, 200 parts of benzanthrone are introduced into a mixture of 200 parts of β-naphtol and 78 parts of caustic potash. Then the mass is heated to about 200° and maintained at this temperature for some hours while stirring. The hot mass is poured into water and the separated reaction product is filtered off. It may be freed from unchanged benzanthrone by extracting it with boiling glacial acetic acid. The new compound having probably the formula:

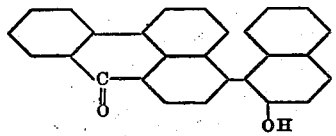

crystallizes from nitrobenzene in bright yellow needles soluble in concentrated sulfuric acid with a red color (without fluorescence). The substance turns red when heated to about 260° and melt above 300°, it dissolves in an alcoholic caustic soda solution with a red color. Instead of β-naphthol its substitution products may be used for our process, for instance 6-bromo-2-naphtol yields an analogous product, crystallizing in yellowish brown colored crystals, soluble in concentrated sulfuric acid with a some more reddish color.

Analogous products are obtainable, if instead of benzanthrone its substitution products having a free 2-position are condensed in the same manner with β-naphthol, so for instance 6-chlorobenzanthrone yields when condensed with β-naphthol a yellowish colored product, easily soluble in hot organic solvents. Similar products are obtainable by starting from methylderivatives of benzanthrone, for instance 6-methylbenzanthrone, in the same manner hydroxy- and amino-derivatives may be used for our process, yielding analogous condensation products.

Example 2

A mixture of 200 parts of α-naphthol and of 80 parts of caustic potash is heated to about 200° and then while stirring 20 parts of benzanthrone are added. The mass is kept for some hours at this temperature and the reaction product is isolated as described in Example 1. The new compound having probably an analogous formula as the product of Example 1, is very similar in its properties with the isomeric product derived from β-naphthol. When recrystallized from nitrobenzene it forms yellow prisms, melting above 300°. Its solution in concentrated sulfuric acid is reddish colored. By replacing α-naphthol by its substitution products, for instance 2-chloro-1-naphthol a similar condensation product is obtained, being when dry a brown powder, melting above 300°, soluble in hot nitrobenzene, the solution showing a reddish fluorescence; its solution in concentrated sulfuric acid is brownish red colored with a yellowish fluorescence.

When replacing the benzanthrone by the corresponding quantity of the benzobenzanthrone-carboxylic acid of the formula:

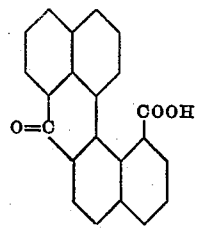

an analogous product of condensation is obtained, forming a brown colored powder, yielding with concentrated sulfuric acid a dark brown colored solution, being difficultly soluble in organic solvents of a higher boiling point with a brownish color.

*Example 3*

By replacing in the process described in the foregoing example the α-naphthol by 225 parts of vicinal meta-xylenol a corresponding condensation product is obtained, having probably the formula:

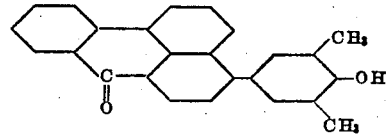

It is when dry a pure yellow powder, soluble in concentrated sulfuric acid with an orange-red, in an alcoholic caustic soda solution with a violet color. It crystallizes from nitrobenzene as compact yellow prisms.

We claim:

1. As new products condensation products of the benzanthrone series, corresponding most probably to the general formula:

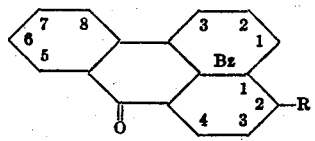

wherein R represents an aromatic nucleus substituted by hydroxyl in one of the positions ortho and para to the bridge carbon atom and wherein the benzanthrone nucleus and the aromatic nucleus R may be further substituted, being when dry yellowish to brownish colored mostly crystalline powders, soluble in organic solvents of a higher boiling point, soluble in concentrated sulfuric acid with a red to brown to olive color, mostly soluble in an alcoholic caustic alkali solution to intensely colored solutions.

2. The process for manufacturing new condensation products of the benzanthrone series, which comprises heating at elevated temperatures a benzanthrone compound having a free 2-position with an aromatic hydroxycompound having no substituents in one of the positions ortho and para to the hydroxyl group in presence of caustic alkalies.

3. The process for manufacturing new condensation products of the benzanthrone series, which comprises heating at temperatures from about 100° to about 250° a benzanthrone compound having a free 2-position with an aromatic hydroxycompound having no substituents in one of the positions ortho and para to the hydroxyl group in presence of caustic alkalies.

4. The process for manufacturing new condensation products of the benzanthrone series, which comprises heating at temperatures from about 100° to about 250° a benzanthrone compound having a free 2-position with an aromatic hydroxycompound having no substituents in one of the positions ortho and para to the hydroxyl group in presence of an amount of a caustic alkali not exceeding essentially the quantity, which is necessary for the formation of the akali salt of the hydroxycompound applied.

5. As a new product a condensation product of the benzanthrone series corresponding most probably to the following formula:

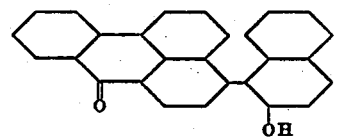

being when dry a yellow crystalline powder, crystallizing from nitrobenzene in bright yellow needles, soluble in concentrated sulfuric acid with a red color, in an alcoholic caustic soda solution with a red color and melting above 300°.

6. The process for manufacturing a new condensation product of the benzanthrone series, which comprises heating at elevated temperatures benzanthrone with β-naphthol in presence of caustic alkalies.

In testimony whereof, we affix our signatures.

GEORG KALISCHER.
HEINZ SCHEYER.